(12) United States Patent
Saleem

(10) Patent No.: US 8,830,239 B2
(45) Date of Patent: Sep. 9, 2014

(54) MATERIALS MANAGEMENT SYSTEM AND METHOD

(75) Inventor: Kashif Saleem, Perth (AU)

(73) Assignee: Saleemz Holdings Pty Ltd, Perth (AU)

( * ) Notice: Subject to any disclaimer, the term of this patent is extended or adjusted under 35 U.S.C. 154(b) by 287 days.

(21) Appl. No.: 12/988,988

(22) PCT Filed: Apr. 21, 2009

(86) PCT No.: PCT/AU2009/000491
§ 371 (c)(1),
(2), (4) Date: Oct. 21, 2010

(87) PCT Pub. No.: WO2009/129563
PCT Pub. Date: Oct. 29, 2009

(65) Prior Publication Data
US 2011/0037764 A1    Feb. 17, 2011

(30) Foreign Application Priority Data

Apr. 21, 2008  (AU) ................................ 2008901970
Sep. 23, 2008  (AU) ................................ 2008904957

(51) Int. Cl.
G06T 11/20 (2006.01)
G06Q 10/00 (2012.01)
G01S 5/00 (2006.01)

(52) U.S. Cl.
CPC .............. G01S 5/0027 (2013.01); G06Q 10/00 (2013.01)
USPC ........................................................ 345/440

(58) Field of Classification Search
USPC ........................................................ 345/440
See application file for complete search history.

(56) References Cited

U.S. PATENT DOCUMENTS

| 6,768,450 | B1* | 7/2004 | Walters et al. ........... 342/357.59 |
| 2003/0001775 | A1 | 1/2003 | Turner |
| 2003/0050871 | A1* | 3/2003 | Broughton ..................... 705/28 |
| 2004/0024644 | A1 | 2/2004 | Gui et al. |
| 2005/0076034 | A1 | 4/2005 | Addonisio |
| 2007/0013690 | A1* | 1/2007 | Grimaud et al. ............. 345/419 |

OTHER PUBLICATIONS

Smiley, John, Learn to Program Visual Basic Databases, Dec. 2002, Muska & Lipman Publishing, Chapter 9, p. 509.*
Chau, K. W., M. Anson, and J. P. Zhang. "4D dynamic construction management and visualization software: 1. Development." Automation in Construction 14.4 (2005): 512-524.*
International Search Report for PCT/AU2009/000491, mailed Jun. 23, 2009.

* cited by examiner

Primary Examiner — Hau Nguyen
Assistant Examiner — Ryan M Gray
(74) Attorney, Agent, or Firm — Nixon & Vanderhye P.C.

(57) ABSTRACT

A materials management system (10) comprises a materials database (12) for storing information relating to the nature identity and location of each item of material on a site. A mobile data processing device (14) is provided, having a data scanner (16) for scanning machine-readable identification information provided in an identification tag attached to an item of material. A GPS receiver (18) is operatively connected to the mobile data processing device (12) for obtaining the GPS coordinates of the item of material. The mobile data processing device (14) transmits the GPS coordinates and the identification information to the materials database (12) so that the location of each item of material on site can be tracked. The materials database (12) can be accessed online from anywhere in the world via satellite link (20) (or internet) using any suitable desktop personal computer (22). The materials management system has particular application to a construction site, and sites where intrinsically safe systems are required.

21 Claims, 9 Drawing Sheets

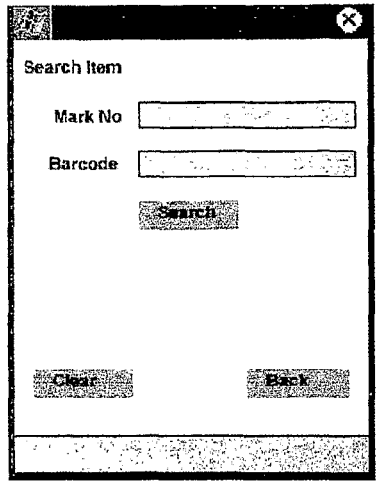
(a)
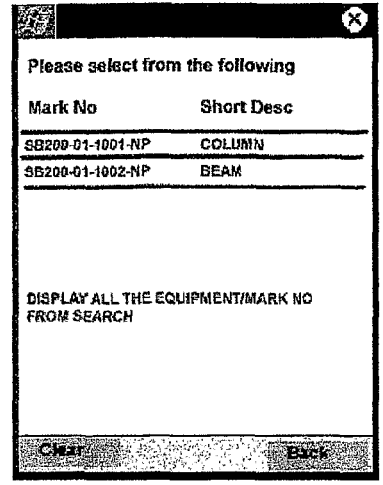
(b)
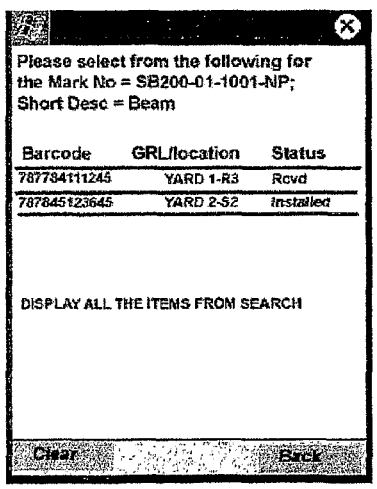
(c)
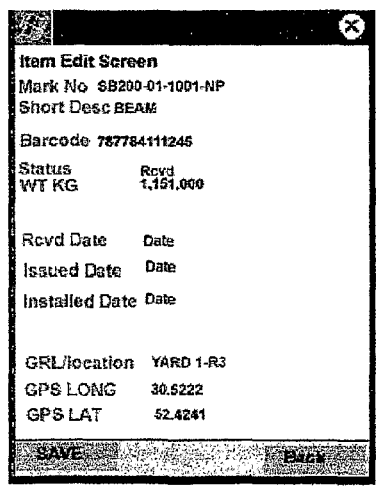
(d)
(e)
FIG. 4.

ProTracker Doc Control can also send transmitals with attachements to outside parties

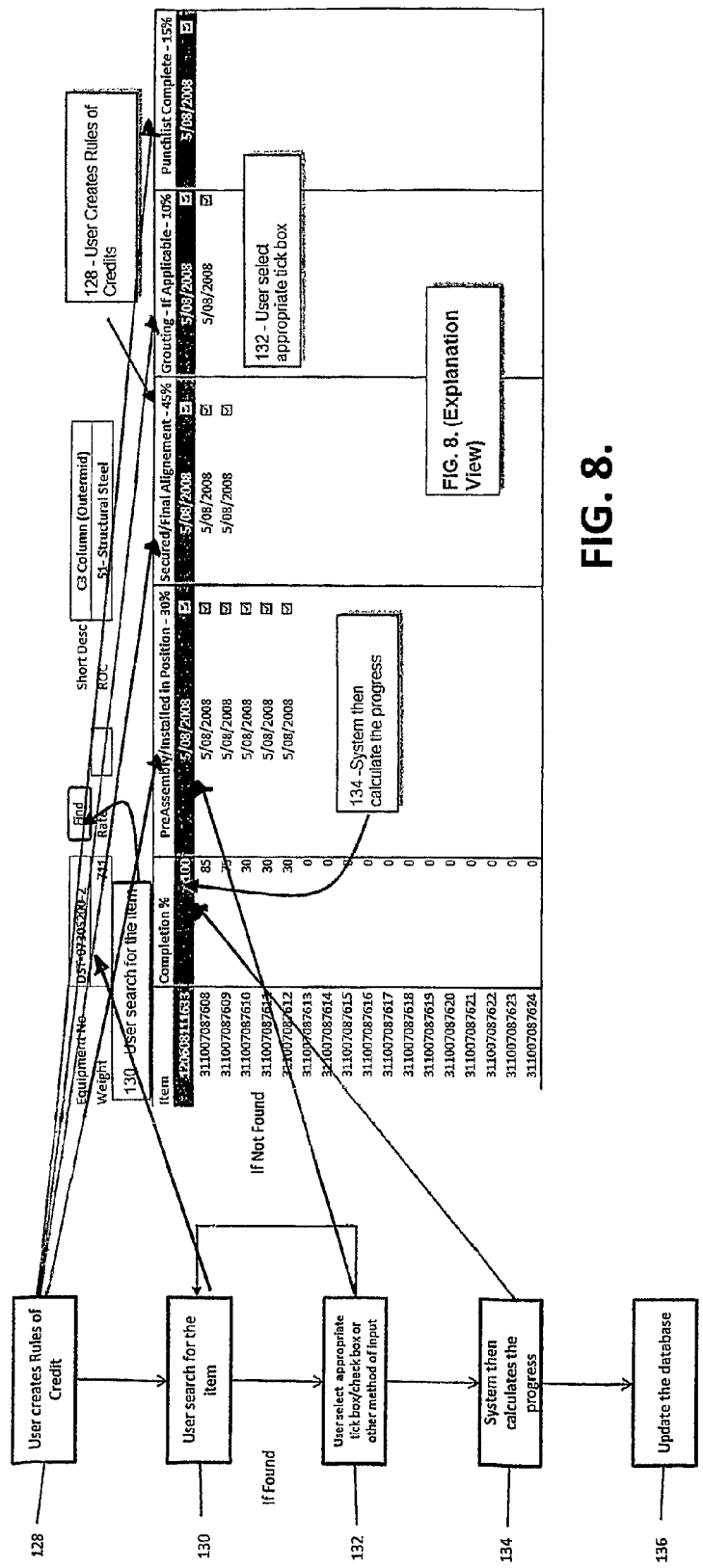
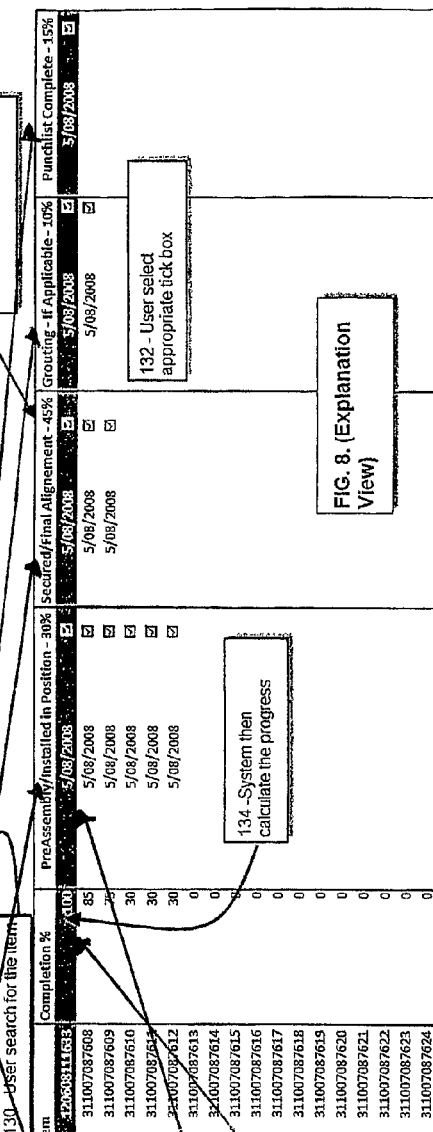
FIG. 8.
FIG. 7.

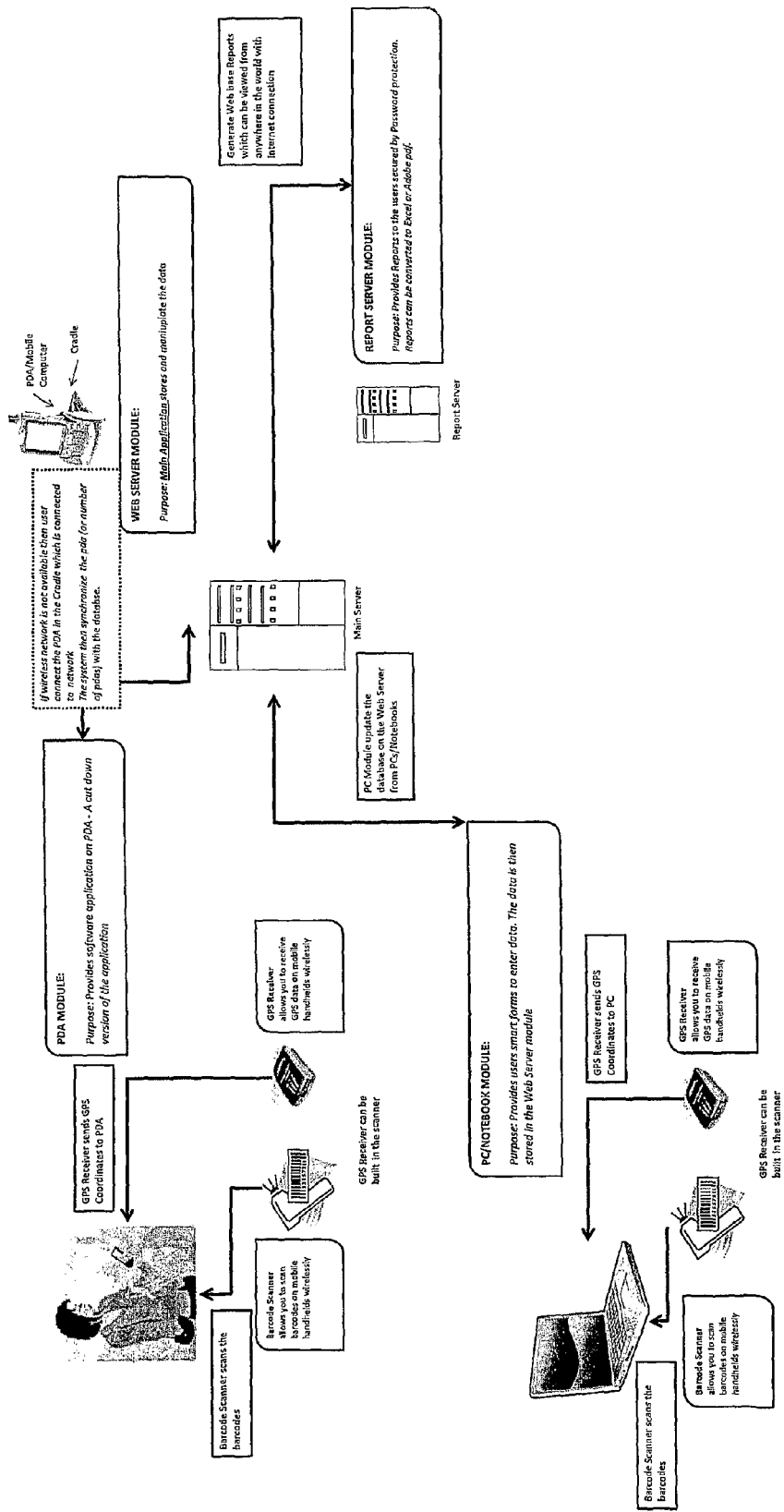

MATERIALS MANAGEMENT SYSTEM AND METHOD

This application is the U.S. national phase of International Application No. PCT/AU2009/000491, filed 21 Apr. 2009, which designated the U.S. and claims priority to Australian Application No(s). 2008901970, filed 21 Apr. 2008 and 2008904957, filed 23 Sep. 2008, the entire contents of each of which are hereby incorporated by reference.

FIELD OF THE INVENTION

The present invention relates to a system and method of materials management on a site and relates particularly, though not exclusively to such a system and method for managing materials for a construction site (onsite and offsite).

BACKGROUND TO THE INVENTION

In large building projects a failure to keep track of construction materials is a major contributor to cost-overruns and construction delays. Construction materials may be delivered on time to the site, but when the time comes to install the materials it can sometimes be difficult to locate the materials in the lay-down yard. The time taken trying to locate the materials consumes precious labour time, and in a worse case scenario a failure to locate the materials requiring re-ordering and delivery adds further unnecessary costs and delays to completion of the project. Therefore it is desirable to have a system and method of managing all phases of the material handling process, from procurement, expedition and transport through to onsite arrival, storage and installation.

The present invention was developed with a view to providing a system and method of materials management which facilitates tracking the location of each item of material offsite and on site from the time of arrival to installation. Although the invention will be described with particular reference to construction sites, it will be appreciated that the invention has wider application to tracking the location of items of material on other sites.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a materials management system for a site, the system comprising:

a materials database for storing information relating to the nature, identity and location of each item of material on a site;

a software module for colour-coding each item on the site in a 3D model of the site, the software module monitoring the database and, as a status of an item changes in the database, changing the colour of the item in the 3D model to give an immediate visual indication of the current status of the item; and, a mobile data processing device having a data scanner for scanning machine-readable information, including identification information, provided in an identification tag attached to an item of material, and a GPS receiver operatively connected to the mobile data processing device for obtaining the GPS coordinates of the item, the mobile data processing device transmitting the GPS coordinates and the identification information to the materials database whereby, in use, the status of each item of material on site can be tracked.

In one embodiment the mobile data processing device is a handheld device. Preferably the mobile data processing device is a handheld personal digital assistant (PDA). Advantageously the data scanner provided in connection with the mobile data processing device is a barcode scanner. Alternatively the data scanner provided in connection with the mobile data processing device is an RFID tag scanner.

In one embodiment the mobile data processing device is an intrinsically safe handheld device. Preferably the mobile data processing device is a handheld personal digital assistant (PDA). Advantageously the data scanner provided in connection with the mobile data processing device is an intrinsically safe barcode scanner. Alternatively the data scanner provided in connection with the mobile data processing device is an intrinsically safe RFID tag scanner.

In one embodiment the GPS receiver is operatively connected to the mobile data processing device by means of a wireless communications link. In an alternative embodiment the GPS receiver is integrated and hardwired into the mobile data processing device.

Advantageously the data scanner provided in connection with the mobile data processing device is capable of scanning additional machine-readable information provided in the identification tag attached to an item of material, such additional machine-readable information relating to the ongoing maintenance of the item.

Preferably the system further comprises one or more sensing devices provided in connection with the item of material for sensing a condition of the item, the sensing device being electronically coupled to the identification tag, wherein information relating to the condition of the item can be stored in the identification tag for maintenance purposes. In one embodiment the identification tag is an RFID tag.

Preferably the system further comprises a document control database in which identification information for any documents associated with an item recorded in the materials database is stored.

Advantageously the system further comprises a progress control database in which the progress of each item in the materials database is controlled according to applicable "Rules of Credit." Typically electronic tick sheets which are linked to the materials database may be used in this regard.

According to another aspect of the present invention there is provided a method of managing materials on a site, the method comprising the steps of:

applying an identification tag to each item of material on a site, the tag containing machine-readable information, including identification information identifying the item of material;

providing a materials database for storing information relating to the nature, identity and location of each item of material on a site;

scanning an identification tag attached to an item of material on site to read the machine-readable information;

obtaining the current GPS coordinates of the item;

transmitting the current GPS coordinates and the identification information to the materials database;

updating the status of the item in the database based on the current GPS coordinates and identification information;

providing a 3D model of the site; and, changing the colour of the item shown in the 3D model based on the current status of the item according to the update information in the materials database whereby, in use, the status of each item of material on site can be tracked.

Preferably the method comprises the further steps of:

storing additional machine-readable information in the identification tag, including information relating to the ongoing maintenance of the item in the identification tag;

transmitting the additional information to the materials database; and, updating a maintenance log for the item in the database whereby, in use, the ongoing maintenance of each item of material on site can be tracked.

Advantageously the additional information stored in the identification tag also includes information relating to the progress of the item in the various stages of construction. Preferably the information relating to the progress of the item is transmitted to and recorded in a progress control database, in which the progress of each item in the materials database is controlled according to applicable "Rules of Credit."

According to a still further aspect of the present invention there is provided a method of updating a materials database for a materials management system, the method comprising the steps of:

retrieving a material item record stored in the materials database upon receiving identification information scanned from an identification tag attached to an item of material;

generating and displaying an update screen for the material item record wherein, in use, an operator can input update information for the material item record, including the current GPS coordinates of the item of material;

updating the material item record in the materials database with the update information;

providing a 3D model of a site where the item of material is to be installed; and, changing the colour of the item shown in the 3D model based on the current status of the item according to the update information in the updated material item record of the materials database.

Preferably the method of updating a materials database further comprises, in the case where a material item entry cannot be retrieved from the materials database based on the scanned identification information, the steps of:

generating and displaying a search screen wherein, is use, an operator can specify a Mark No for the material item;

searching the materials database for all items having the specified Mark No;

displaying the search list for all items with the specified Mark No wherein, in use, an operator can select an item from the search list; and, retrieving a material item record stored in the materials database corresponding to the item selected by the operator.

Preferably the method of updating a materials database further comprises, in the case where no items having the specified Mark No can be retrieved from the materials database or where none of the items with the specified Mark No corresponds to the material item, the steps of:

generating and displaying a screen that enables the operator to create a new record in the materials database for the specified Mark No or material item; and, storing the new record in the materials database.

Advantageously the method of updating a materials database further comprises the steps of:

providing an associated progress control database;

creating suitable "Rules of Credit" for controlling the progress of an item of material in the progress control database;

assigning a "Rule of Credit" to each item in the materials database; and progressing each item in the progress control database according to the applicable "Rule of Credit."

According to a further aspect of the present invention there is provided a materials management system for a construction site, the system comprising:

a materials database for storing information relating to the nature, identity and location of each item of material on the construction site;

a software module for colour-coding each item on the site in a 3D model of the construction site, the software module monitoring the database and, as a status of an item changes in the database, changing the colour of the item in the 3D model to give an immediate visual indication of the current status of the item; and, a mobile data processing device having a data scanner for scanning machine-readable information, including identification information, provided in an identification tag attached to an item of material, and a GPS receiver operatively connected to the mobile data processing device for obtaining the GPS coordinates of the item, the mobile data processing device transmitting the GPS coordinates and the identification information to the materials database whereby, in use, the status of each item of material on the construction site can be tracked.

In one embodiment the mobile data processing device is a handheld device. Preferably the mobile data processing device is a handheld personal digital assistant (PDA). Advantageously the data scanner provided in connection with the mobile data processing device is a barcode scanner. Alternatively the data scanner provided in connection with the mobile data processing device is an RFID tag scanner.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of system and method of materials management, given by way of example only, with reference to the accompanying drawings, in which:

FIG. 4(a), (b), (c), (d) and (e) are screen shots of a various screens typically displayed on a preferred embodiment of a mobile data processing device employed in the system of FIG. 1;

FIG. 5 (b) is an example of a 3D model of a construction site showing various items colour-coded according to their current status in the materials database provided in the system of FIG. 1;

FIG. 7 is a flow chart illustrating the process of updating a progress control database associated with the system of FIG. 1;

FIG. 8 is a screen shot of a preferred embodiment of a progress control screen employed in connection with the progress control database of FIG. 7;

FIG. 9 is a flow chart illustrating a process flow (batch mode) showing how a user can update the information on various devices and can then upload the information using a docking system.

DETAILED DESCRIPTION OF PREFERRED EMBODIMENTS

Figure 1:
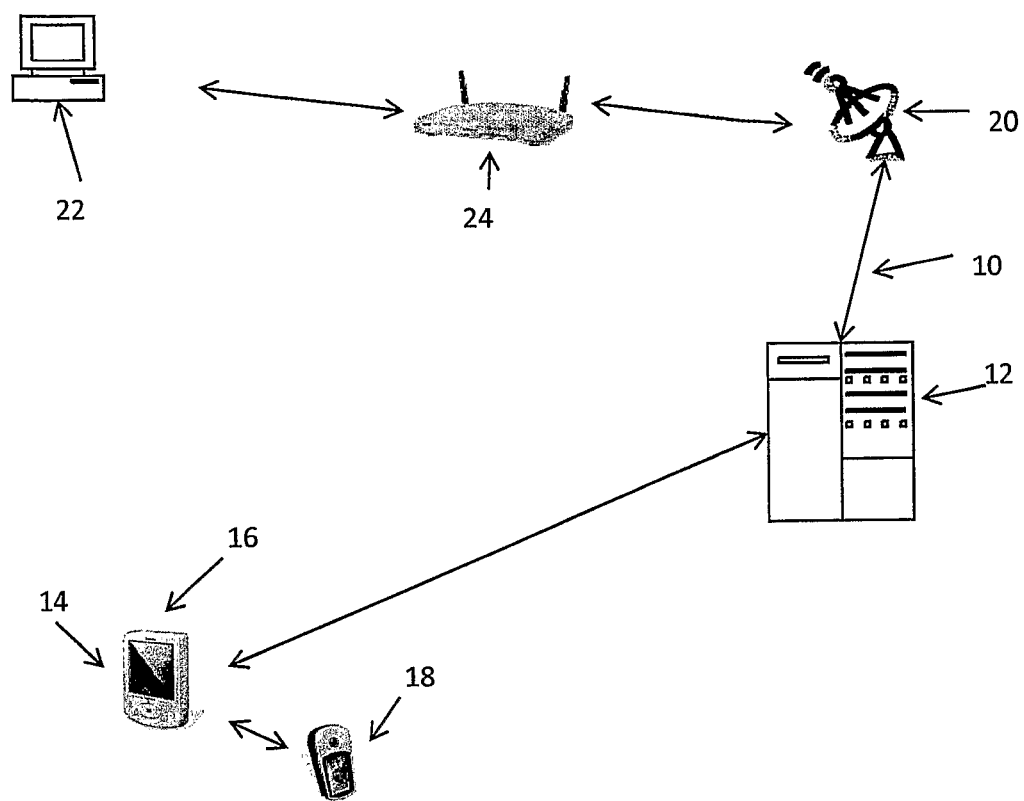
FIG. 1 illustrates a preferred embodiment of a system for managing materials on a site.

A preferred embodiment of materials management system 10 in accordance with the invention, as illustrated in FIG. 1, comprises a materials database 12 for storing information relating to the nature, identity and location of each item of material on a site. The database 12 is preferably an SQL Server database system hosted on a web server operating with a Microsoft Windows operating system platform using the .NET Framework. SQL Server is a relational database management system (RDBMS) produced by Microsoft (Registered Trade Mark). Its primary query language is Transact-SQL, an implementation of the ANSI/ISO standard Structured Query Language (SQL). SQL Server allows multiple clients to use the same database concurrently. As such, it is able to control concurrent access to shared data; it will ensure data integrity when multiple clients update the same data, or clients attempt to read data that is in the process of being changed by another client.

The system preferably further comprises a mobile data processing device 14 having a data scanner 16 for scanning machine-readable identification information provided in an identification tag attached to an item of material. In this embodiment the identification tag is a machine-readable barcode printed on a label which is attached to the item of material. However any other suitable identification tag, with machine-readable identification information, may be employed, for example, a Radio Frequency Identification (RFID) tag. In the illustrated embodiment the mobile data processing device 14 is a Symbol MC9090-S handheld mobile computer (PDA) manufactured by Motorola. The Symbol MC9090-S PDA uses the Microsoft Windows Mobile operating system and incorporates omnidirectional 1D and 2D image scanning data capture technology 16 suitable for reading barcode labels. The MC9090-S PDA 14 is configured as a client of the SQL Server database system 12 and communicates with the database 12 using web services provided via mobile telephone coverage.

A GPS receiver 18 is operatively connected to the mobile data processing device 12 for obtaining the GPS coordinates of the item of material. In this embodiment the GPS receiver is a Bluetooth GPS receiver manufactured by Linkspoint which can be connected to any Bluetooth-enabled mobile device and is capable of providing the global positioning coordinates of a specific location with an accuracy of within 3-5 meters. The Linkspoint Bluetooth GPS receiver supports the Windows Mobile operating system and can be operatively connected to the MC9090-S 14 using a Bluetooth wireless link. In an alternative embodiment (not illustrated) the GPS receiver chip set is integrated into the mobile data processing device 14 and is operatively connected thereto by hardwiring.

Being a web-based system, the materials database 12 can be accessed online from anywhere in the world via satellite link 20 (or internet) using any suitable desktop personal computer 22 or laptop personal computer (not shown). The personal computer is typically connected to the web using a broadband connection via a router 24 and enables the user to access various reporting functions provided with the materials database software to analyse, manage and document construction progress.

Figure 2:
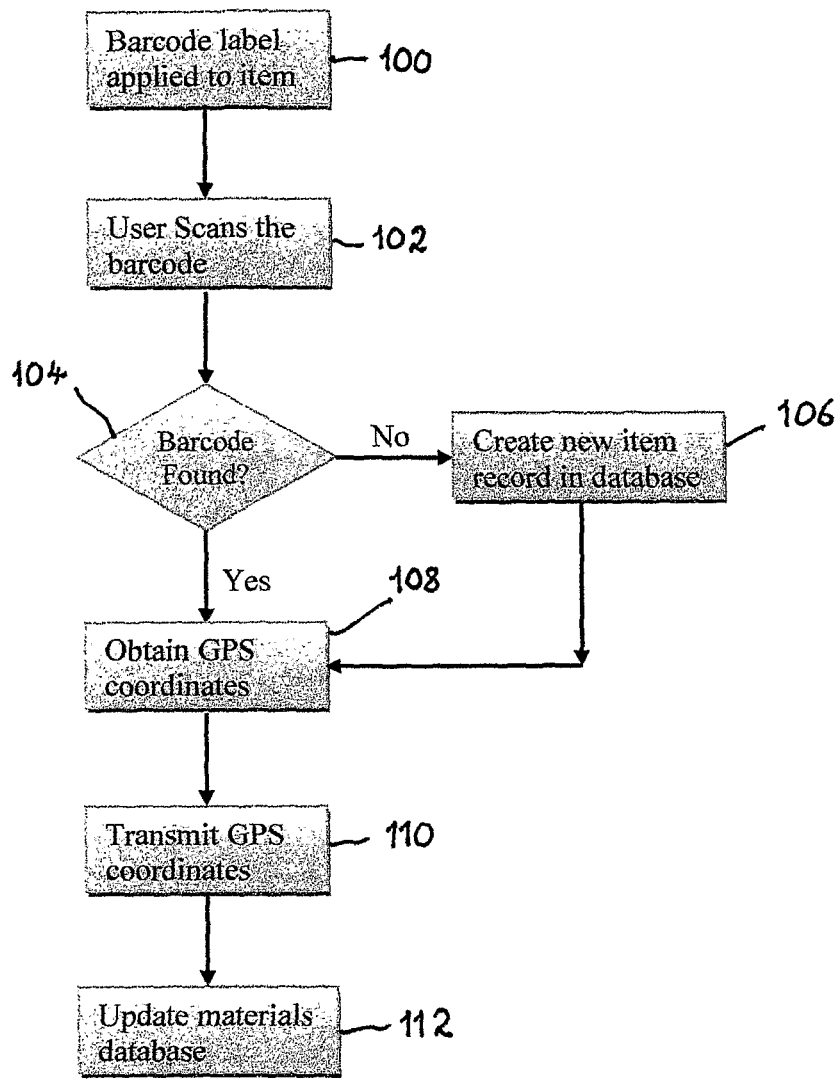
FIG. 2 is a flow chart illustrating a preferred embodiment of a method of managing materials on site employing the system of FIG. 1.

A preferred method of managing materials on a construction site will now be described with reference to FIG. 2. When an item of construction material, for example, a steel beam, first arrives on site, a barcode label is applied to the item, indicated as step 100. The materials may already have been entered into the materials database, for example, at the time of procurement, and each type of material given a unique Mark No. If there is more than item of the same type of material, each item receives a unique barcode, even though they may all have the same Mark No. The bar-coded items are then scanned using the PDA 14, indicated as step 102.

The PDA 14 then communicates with the materials database 12 and checks if this bar-coded item already appears in the database 12. This query is indicated in FIG. 2 as step 104. If the item does not appear in the database a new entry can be made in the database 12 via the PDA 14, indicated as step 106. If the item is found in the database 12, the PDA 14 then obtains the GPS coordinates from the associated GPS receiver 18, indicated as step 108. When the longitudinal and latitudinal GPS coordinates are obtained, this information is then transmitted to the materials database 12, indicated as step 110, and the materials database 12 is updated with the new coordinates, indicated as step 112. Other information relating to the item may be updated in the database 12 via the PDA 14, for example, if the item has been installed the date of installation.

A preferred method of updating an item or creating a new item in the database 12 using the PDA 12 will now be described in more detail with reference to FIGS. 3 and 4. The user scans the barcode on an item using the data scanner 16 provided in connection with the PDA 14, indicated as step 114 in FIG. 3. If for some reason the barcode label will not scan, the user can also enter the barcode No. manually via the PDA keypad. This query is indicated as step 116 in FIG. 3. If the barcode is found and it's a good read then the PDA displays the Update Item Screen, indicated as step 124.

Figure 3:
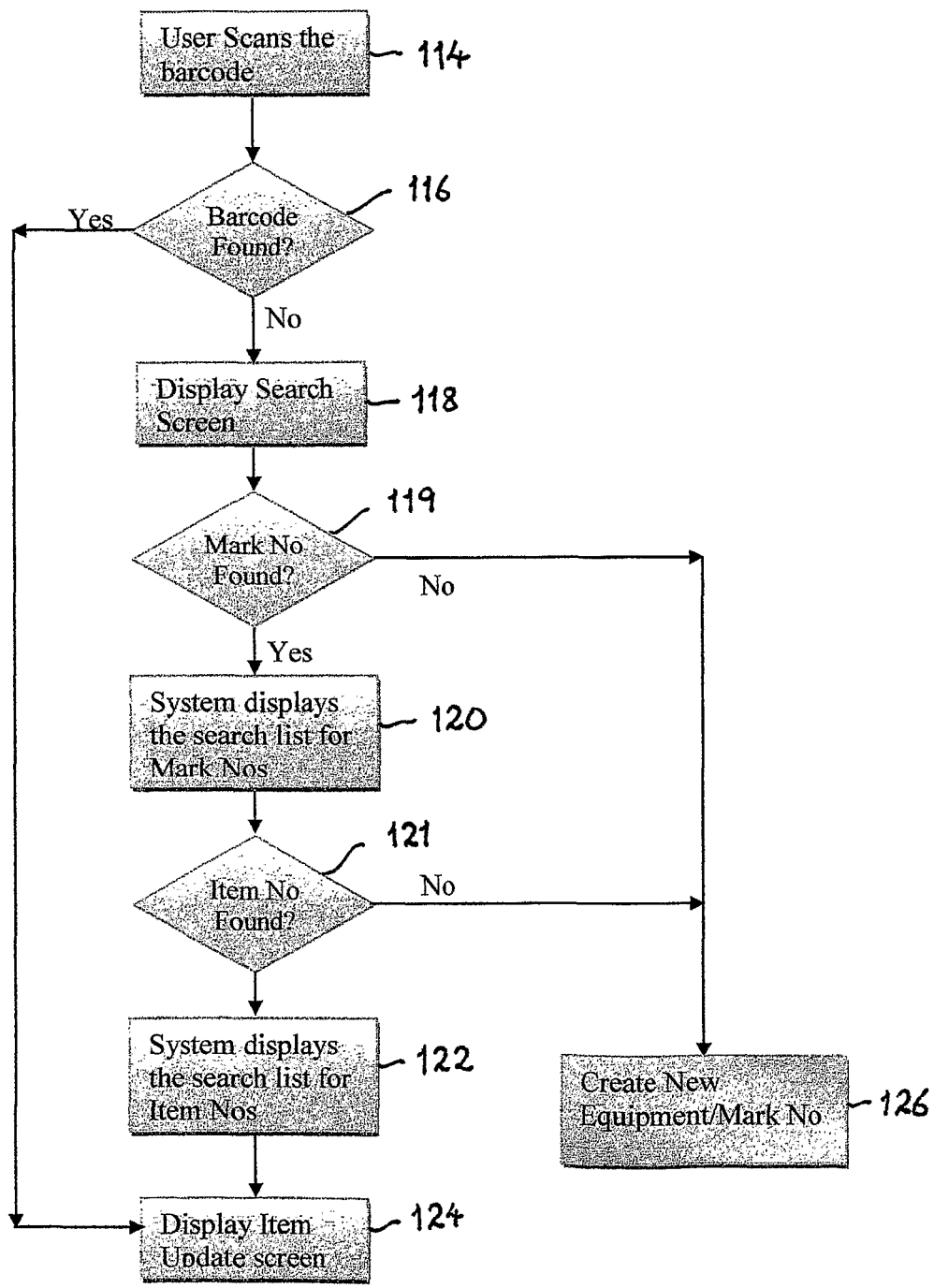
FIG. 3 is a flow chart illustrating a preferred embodiment of the process of updating information in a materials database provided in the system of FIG. 1.

If the barcode is not found (bad read) then the PDA 14 displays the Search Screen, indicated as step 118 in FIG. 3. A sample screen shot of the Search Screen is shown in FIG. 4(*a*). When the "Search" button is pressed, the PDA 14 sends a query to the database 12 to find the matching Mark Nos. This query is indicated as step 119 FIG. 3. If no matching Mark Nos are found, the system displays the Create New Equipment/Mark No Screen, indicated as step 126 in FIG. 3. If any matching Mark Nos are found, the PDA then displays the search list for the matching Mark Nos on the PDA 14, indicated as step 120 in FIG. 3. A screen shot of a typical search list in a "Select Mark No Screen" from which a user can select the desired Mark No is shown in FIG. 4(*b*).

The user looks for the desired Equipment/Mark No on the screen and selects the desired Mark No (e.g. by clicking on the Mark No on the screen). The system then queries the database 12 for all the items relating to that Mark No, indicated as step 121 in FIG. 3. If no items are found, the system displays the Create New Equipment/Mark No Screen, indicated as step 126 in FIG. 3. If any items relating to that Mark No are found, the list of items is displayed on the PDA 14, indicated as step 122 in FIG. 3. A screen shot of a typical search list in a "Select Item Screen" from which a user can select the desired item is shown in FIG. 4(*c*).

When the user selects the desired item from the list, the system then displays the Update Item Screen, indicated as step 124 in FIG. 3. A screen shot of a typical Update Item Screen is shown in FIG. 4(*d*). The following items will populate according to the information in the database for that item:
1. Mark No
2. Short Description of item
3. Barcode No
4. Status
5. Wt (KG)
6. Received Date
7. Issue Date
8. Install Date
9. GRL/Location
10. GPS Longitudinal coordinate
11. GPS Latitudinal coordinate The following fields are read only: Mark No, Short Desc, Status, and Wt (KG) The following fields are read and write: Barcode, Received Date, Issue Date, Install Date, GRL/Location, GPS Long, GPS Lat.

The user can then update the required fields via the PDA 14 and the updated information is then transmitted to the materials database 12. For example the No printed on the barcode label can be entered into the Barcode field. When the "Save" button is clicked the item is automatically undated in the database 12. In this way the location, status and physical attributes of each item of construction material on the site can be updated.

In order to create a new entry in the database 12 for a new item of Equipment/Mark No, the Create New Equipment/Mark No Screen is displayed, indicated as step 126 in FIG. 3. A screen shot of a typical Create New Equipment/Mark No Screen is shown in FIG. 4(*e*). This screen displays the Equipment Fields from an Equipment table provided in the database 12. The user enters the following fields to create new items
1. Mark No
2. Short Desc
3. Category (Drop Down)
4. Wt (Kg)
5. Qty (integer)

The functionality of the buttons provided on the PDA screen is as follows:
Create Button: when the Create button is pressed
1) the system should add the Mark No Details in the Equipment table and
2) the number of items should be created for that Mark No in the item table according to the Qty.
   a. E.g. if user enters Qty=10 for mark no SB200-01-1001-NP it should create 10 items associated to Mark No SB200-01-1001-NP
Mark Nos are unique so no duplicates should be created.
Search Button: When the search button is pressed
1) the system should display "Select Item Screen" (see FIG. 4(*c*)) for that Mark No.

Using the preferred method and system 10 of materials management described above the location, status and physical attributes of each item of construction material on the site can be updated and tracked at any point during its construction lifecycle. For example, when queried on a hypothetical material xx01 the system confirms that the item has been ordered, provides a docket number, the date of arrival on site and its precise weight. A user entering the Mark No xx01 into the system will see that the material in question has arrived and is located in the lay-down yard at the coordinates 34.45 N and 34.31 E. A query on Mark No xx03 will reveal that the material has been installed and 90% completed, and so on.

The system is designed to handle large volumes of data and supports many simultaneous users whilst maintaining a fast response and high degree of accuracy. The system provides a variety of custom options that can be tailored to the intended end-user application, and it is also very easy to set up and use. It requires minimal IT support, since the PDA software is run from one small file which can be emailed to the client for immediate use. A minimum amount of training is required before a user is up and running.

In the case where barcode labels are used for storing machine-readable identification information the tracking of the material item typically ends when the item has been installed and construction is finished. However in the case where the machine-readable identification information is stored in an active device such as, for example, a Radio Frequency Identification (RFID) tag, the possibility exists of extending the tracking of the item for maintenance purposes. The materials management system 10 can then be employed for monitoring the ongoing maintenance of equipment or plant on a construction or mine site. This may be particularly advantageous where various types of sensing device may be electronically coupled to the RFID tag.

For example, the RFID tag may be electronically coupled to a temperature sensing device, a corrosion detecting device, a pressure sensor or a strain gauge. Sensing information from the sensing device may be stored in the RFID tag to be collected during periodic maintenance surveys of the installation or equipment. The RFID tag may also store the date when the last maintenance check was done and when the next maintenance check is due. A temperature sensor may, for example, be used to monitor the temperature of a pipe carrying process fluids. Alternatively, or in addition, a strain gauge may monitor the stresses applied to a beam or a welded joint on the beam. This kind of information is valuable for the ongoing safety and maintenance of the installation, and by logging this information electronically in the RFID tag it can be periodically accessed by maintenance workers using a handheld PDA 14. The logged data is then uploaded to the corresponding record for that material item in the materials database 12, from where it can be analysed and appropriate maintenance action taken if necessary.

Advantageously a plug-in software module has been designed for the materials management system that enables it to be integrated with NavisWorks 3D modelling software developed by Autodesk. Each item on the construction site is colour-coded in a 3D model of the construction site. As the status of the item changes in the database with each update, so the colour of the item in the 3D model also changes to give an immediate visual indication of the current status of the item. The numbers of statuses and names of these statuses can be changed according to the particular needs of the user.

Figures 5A, 5B:
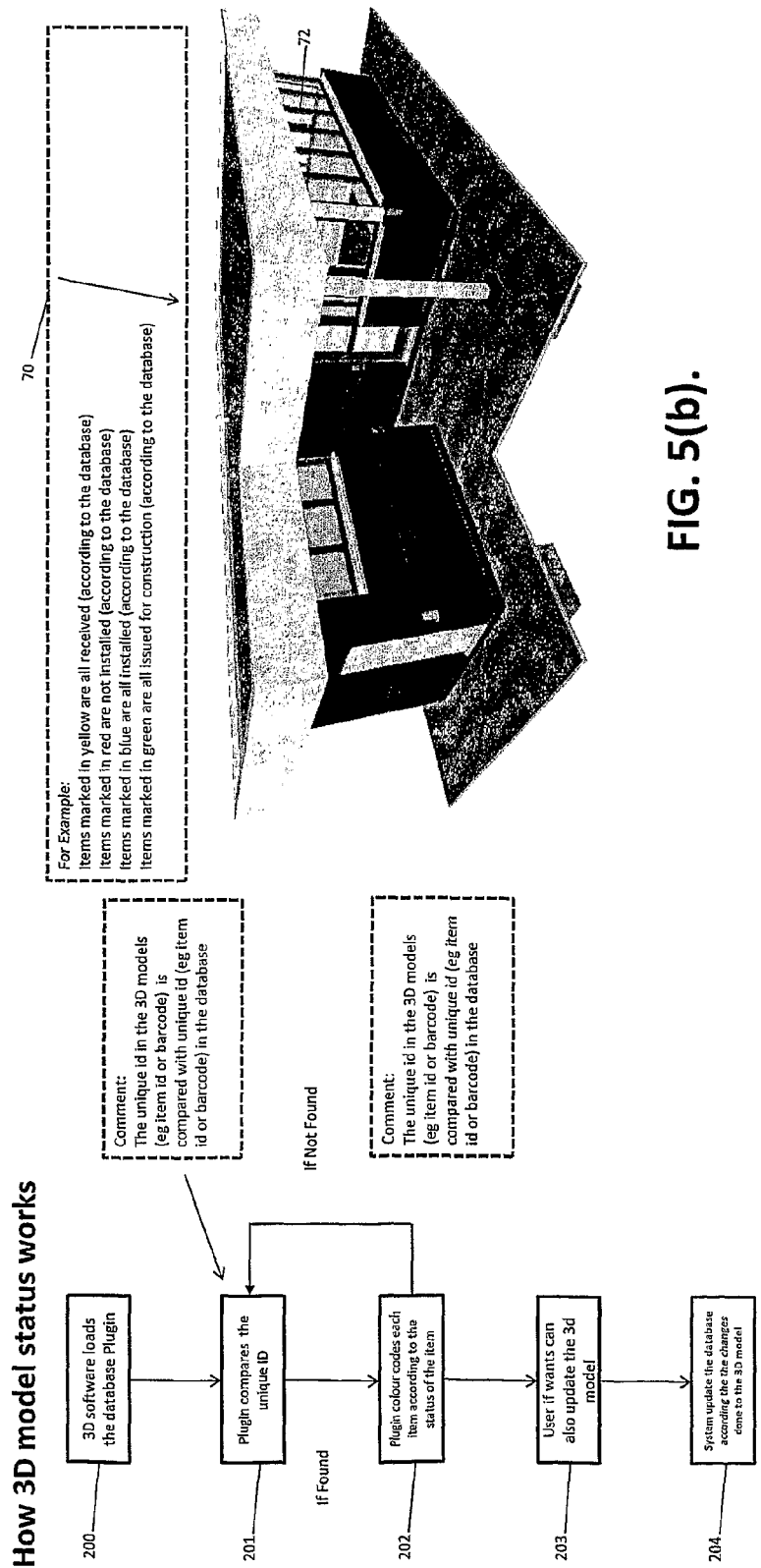
FIG. 5 (a) is a flow chart illustrating a preferred method of updating a materials database using 3D Software.

FIG. 5(*a*) is a flow chart illustrating the function of the database plug-in which operates with the 3D modelling software to provide a visual indication of the current status of each item of material on the construction site. At 200 the 3D modelling software loads the database plug-in which then provides an operational link with the materials database 12. Each item in the 3D model of the construction site 70 is given a unique id code (corresponding to the item id or barcode applied to the item of material on the construction site). At step 201 the plug-in compares the unique id of each item in the 3D model with the item id or barcode in the materials database 12, and when a match is found it updates the colour of the item in the 3D model at step 202 according to the current status of the item in the database.

At step 203 a user can also manually update the colour of an item in the 3D model. In that case the plug-in updates the database at 204 based on the changes made to the 3D model. Typically, an item in the 3D model coloured yellow has been received on the building site, but not yet issued for construction. Once it has been issued for construction (as updated in the database) the colour is changed to green. If an item has not yet been installed (according to the database) it is coloured red; however once it has been installed it is coloured blue. Hence by looking at the 3D model it is possible to see immediately the current status of each item on the construction site.

FIG. 5 (*b*) shows an example of a drawing of a 3D model 70 of a construction site in which various items are colour-coded according to the their current status in the materials database. When an item, for example a window frame 72 with Mark No: SP-1234, is due on site it may be shown coloured red in the 3D model. Hence anyone viewing the 3D model can immediately see that all the items coloured red in the model are due on site but have not yet arrived. When an item arrives the materials database 12 is updated in the manner described above. Fields updated in the database 12 typically include the Received Date, Received By, Docket No, Location, and GPS coordinates. If a date is entered in the Received Date field, then the colour of the item in the 3D model is automatically changed to yellow.

When the item is issued on site, the following fields are typically updated: Issue Date, Issued By, Location, and GPS coordinates. If a date is entered in the Issue Date field, then the colour of the item in the 3D model is automatically changed to green. This immediately provides a visual indication to a viewer of the 3D model that the window frame 72 with Mark No SP-1234 has arrived and been issued on site. When the window frame 72 is installed the following fields typically are updated in the database 12: Install Date, Installed By, Location, and GPS coordinates. Once again, if a date is entered into the Install Date field, then the colour of the window frame 72 in the 3D model is automatically changed to blue.

Figure 6:
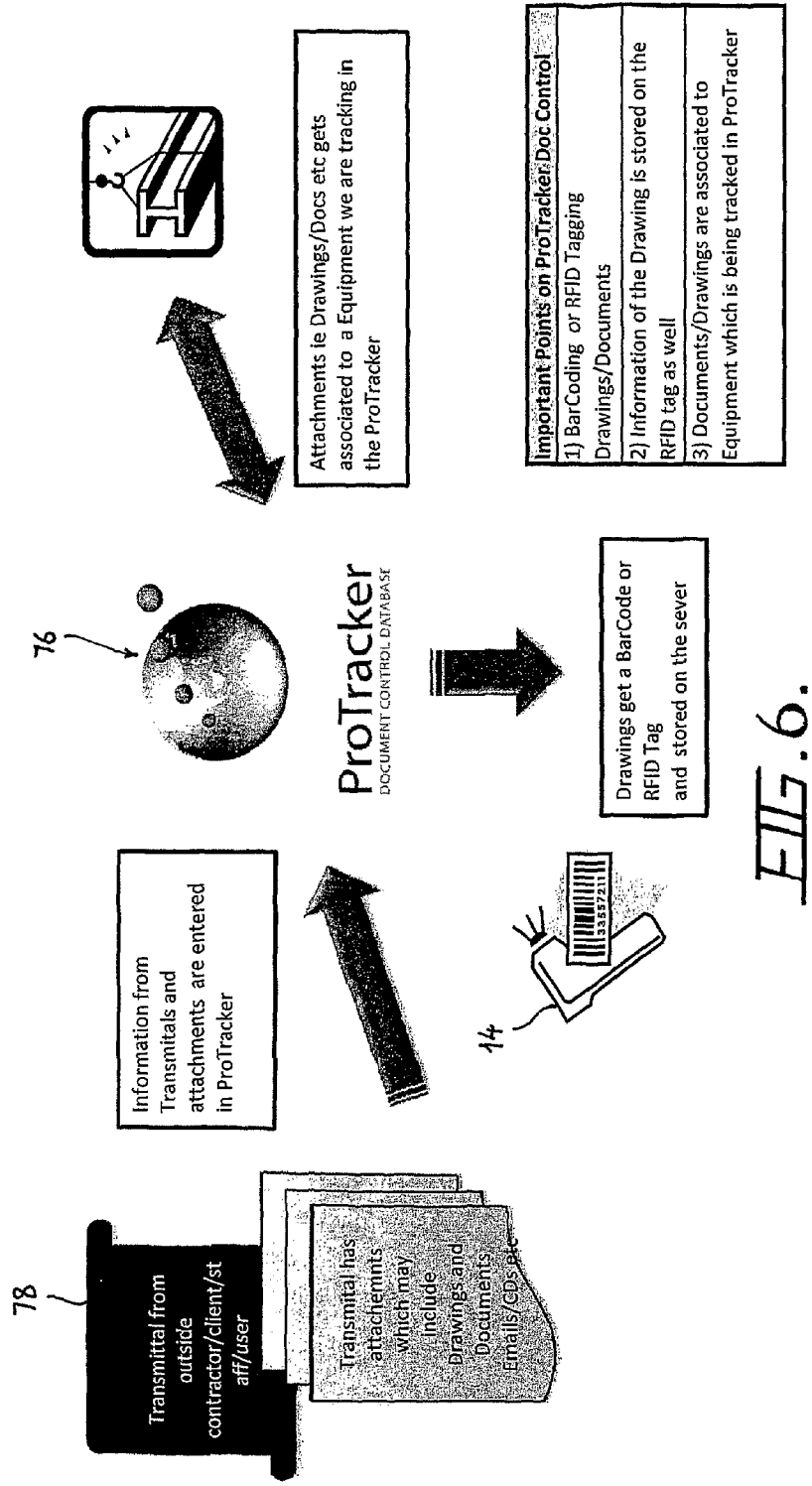
FIG. 6 illustrates schematically a preferred embodiment of a document control database associated with the system of FIG. 1.

Advantageously the materials management system 10 also includes a document control database 76 which is integrated with the materials database 12. A typical process of associating a document that relates to an item recorded in the materials database 12 is illustrated schematically in FIG. 6. When a transmittal 78 is received from a client, an outside contractor, other staff or a user, it may have attachments, including drawings, emails, CDs, and/or other documents which relate to an item recorded in the database 12. Each document is given a barcode or RFID tag which is scanned with the hand-held PDA 14 and recorded in the document control database 76 on the server. If an RFID tag is used, identification information relating to the document is stored on the RFID tag as well.

A screen is generated by the software for display on the PDA 14 or an a desktop PC 22 connected to the system 10 (see FIG. 1), in which identification information relating to the document appears and in which the document can be associated by the user with the corresponding item in the materials database 12 by its Mark No and Item No. In this way documents which relate to a piece of equipment or an item in the materials database 12 can remain associated with that item throughout its life cycle.

Advantageously the materials management system may also incorporate a progress control database 80 for monitoring the progress of construction on a construction site. FIG. 7 is a flow chart illustrating the process of updating a progress control database 80, which is linked to the materials database 14 of FIG. 1. "Rules of Credit" are created and entered at 128 into the system 10. A "Rule of Credit" is the rule an item or piece of equipment received on site must follow in order to progress during the construction phase. Each item recorded in the database 14 is assigned a "Rule of Credit". Each item received on site is then progressed according to the applicable "Rule of Credit." Progress of each item or piece of equipment is recorded and can be monitored using a special grid, unlike Excel, thus avoiding data entry, etc. Typically electronic tick sheets which are linked to the materials database may be used to assist in this regard.

A user employs the progress control database (PCDB) 80 to update the materials database 12 as follows. At 130 the item is located in the PCDB and when found its progress is updated by the user selecting the appropriate tick box/check box or other method of data input at 132. The system then calculates the progress according to the applicable "Rule of Credit" at 134, and the materials database 12 is updated accordingly at 136.

FIG. 8 is a screen shot of a preferred embodiment of the Progress Control Screen for the progress control database 80. The barcode or RFID tag on each item is used to monitor the progress and to update the database as described above. In the case of RFID tags, information concerning the progress of the item can also be stored on the tag. As can be seen in FIG. 8, the Progress Control Screen includes a number of columns relating to each stage in the construction phase of an item or piece of equipment according to its "Rule of Credit". In this case, a number of C3 Columns are listed by item Nos in the far left column. The first item has progressed all the way to completion (100%), through the Preassembly/Installed, Secured/Final Alignment, Grouting (if applicable) and Punchlist Complete stages. The second item in the screen shot is 85% completed; only the final stage (Punchlist Complete) has not been completed.

The Progress Control Database 80 thus enables the project manager to see at a glance at what stage of construction each item in the materials database 12 is at. Also the Progress Control Database 80 provides a reference for the construction managers to control the progress of construction, since an item cannot be progressed in the database unless it is progressed according to the applicable "Rule of Credit." The Progress Control Database 80 thus adds a further useful tool to the materials management system 10 for managing the movement, installation and commissioning of all material items on a site during all phases of construction.

The materials management system of the invention has particular application to a construction site since it is relatively easy to use and can readily be operated from a remote location. In view of the large area covered by some construction sites such as mine sites the management system of the invention is particularly useful in such applications.

For example in FIG. 7, the user creates the following rules of credit (Preassembly=30%; Secured 45%; Grouting 10%; Punch list complete 15%). The user then searches for a column tag no/mark no DST-07305200-2. PCDB then displays all the items/barcodes associated to DST-07305200-2 (FIG. 8). User then selects the appropriate tick box for example in item no 120608111633 all the tick boxes for preassembly=30%, secured 45%, grouting 10%, punch list complete 15% are selected 132. PCDB then calculates the progress and in this instance it is 100% 134. Once confirmed by the user the system then updates the database 136.

Figure 10:
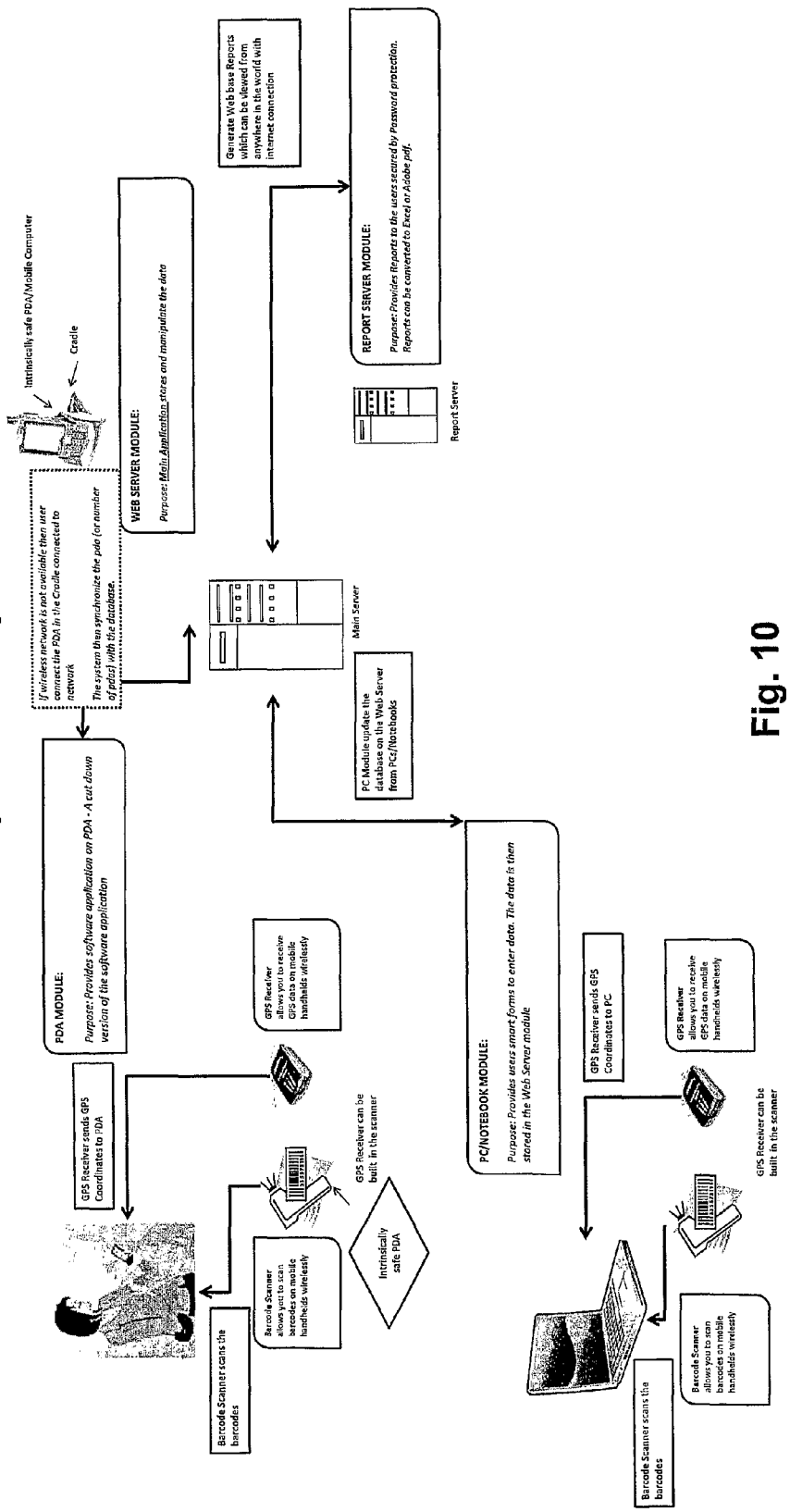
FIG. 10 is a flow chart illustrating a process flow (safe mode).

The materials management system of the invention can work in a batch mode when there is no wireless connection or network available. This is ideal for remote sites where there is no IT or communication infrastructure is available. The user can update the information on mobile computers/PDA/handheld devices and then can upload the information using a docking system (see FIG. 9). The materials management system of the invention can work on sites where intrinsically safe environment is required (eg Oil and Gas fields). In this case intrinsically safe PDAs or mobile devices will be used in the fields and the system will run in a batch mode (see FIG. 10).

The materials management system of the invention will also work if there is no identification tag on an item. This is because the system can interrogate or query the database using the Mark no or Tag no which is stamped on the item. This is ideal for sites where the items or equipments are coming from area (eg overseas) where it is not feasible to attach a tag to an item.

Now that a preferred embodiment of the system and method of materials management have been described in detail, it will be apparent that the embodiment provides a number of advantages over the prior art, including the following:

(i) It helps to avoid costly down-times by providing up-to-date tracking and management of all items of construction material on a site.

(ii) It is easy to use and the handheld PDA facilitates rapid, real time updating of information in the database.

(iii) It is readily scalable to suit any sized project and is fully compatible with other commonly used in-house software systems.

(iv) It provides increased productivity onsite due to up-to-date information on material delivery, movement and inventory.

(v) It enables increased productivity for procurement staff and material controllers by minimising the risk of mistakes and reducing the requirements for double entry of data.

(vi) It provides useful plug-in tools to facilitate visual representation of progress on site using 3D modelling software and a Progress Control Database It will be readily apparent to persons skilled in the relevant arts that various modifications and improvements may be made to the foregoing embodiments, in addition to those already described, without departing from the basic inventive concepts of the present invention. For example, instead of the MC9090-S PDA a GPS-enabled Blackberry, iPhone or any Windows mobile base device such as (mate JasJam, could be used as the mobile data processing device. Therefore, it will be appreciated that the scope of the invention is not limited to the specific embodiments described and is to be determined from the appended claims.

The claims defining the invention are as follows:

1. A materials management system for a site, the system comprising:
    a materials database storing information relating to the nature, identity, status and location of each item of material on the site;
    a progress control database storing information on changes to be made to each item at the site as indicated by one of a Rules of Credit assigned to the item, and the progress control database stores information on a current status of each item indicating the last change made to each item at the site as the item progresses toward completion, wherein the last change is according to the one of the Rules of Credit assigned to the item;
    a software module for color-coding each item in a three-dimensional (3D) model of the site, the software module monitoring the materials database and the progress control database and, as the current status of an item changes in at least one of the materials and progress control databases, changing the color of the item in the 3D model to give a visual indication of the current status of the item; and,
    a mobile data processing device including a data scanner for scanning machine-readable information, including item identification information and information relating to the current status of the item, wherein the machine-readable information is provided in an identification tag attached to the item, and a GPS receiver operatively connected to the mobile data processing device for obtaining the GPS coordinates of the item, the mobile data processing device transmitting the GPS coordinates of the item, the identification information of the item and the current status information of the item, to at least one of the progress control database and the materials database whereby, in use, the current status of each item of material on site can be tracked.

2. A materials management system for a site as defined in claim 1, wherein the mobile data processing device is a handheld device.

3. A materials management system for a site as defined in claim 1, wherein the mobile data processing device is a handheld personal digital assistant (PDA).

4. A materials management system for a site as defined in claim 1, wherein the mobile data processing device communicates with the materials database via mobile telephone coverage.

5. A materials management system for a site as defined in claim 1, wherein the data scanner provided in connection with the mobile data processing device is a barcode scanner.

6. A materials management system for a site as defined in claim 1, wherein the data scanner provided in connection with the mobile data processing device is an RFID tag scanner.

7. A materials management system for a site as defined in claim 1, wherein the GPS receiver is operatively connected to the mobile data processing device by means of a wireless communications link.

8. A materials management system for a site as defined in claim 1, wherein the GPS receiver is integrated and hardwired into the mobile data processing device.

9. A materials management system for a site as defined in claim 1, wherein the data scanner provided in connection with the mobile data processing device is capable of scanning additional machine-readable information provided in the identification tag attached to an item of material, such additional machine-readable information relating to the ongoing maintenance of the item.

10. A materials management system for a site as defined in claim 1, wherein the system further comprises one or more sensing devices provided in connection with the item of material for sensing a condition of the item, the sensing device being electronically coupled to the identification tag, wherein information relating to the condition of the item can be stored in the identification tag.

11. A materials management system for a site as defined in claim 1, wherein the identification tag is an RFID tag.

12. A materials management system for a site as defined in claim 1, wherein the system further comprises a document control database which stores identification information for documents associated with one or more of the items of material.

13. A materials management system for a site as defined in claim 1, wherein electronic tick sheets are linked to the materials database.

14. A method of managing materials on a site, the method comprising the steps of:
- applying an identification tag to each item of material on the site, the tag containing machine-readable information including identification information identifying the item of material and information relating to changes to be made to the item at the site;
- providing a materials database for storing information relating to the nature, identity, current status and location of each item of material on the site, wherein the current status indicates the change last made to the item as prescribe in a Rule of Credit assigned to the item;
- providing a progress control database including Rules of Credit, wherein each of the Rules of Credit sets forth changes to be made to an item at the site and assigned to the Rule of Credit;
- changing each of the items at the site in accordance with the one of the Rules of Credit assigned to the item and, in response to the changing of each item, updating the current status of the item to indicate the change made to the item;
- scanning an identification tag attached to an item of material on the site to read the machine-readable information;
- obtaining current GPS coordinates of the item having the attached identification tag;
- transmitting the current status of the item to at least one of the materials database and the progress control database, wherein the current status includes the current GPS coordinates of the item, the identification information of the item and the updated status of the item;
- updating information in at least one of the materials database and the progress control database with the received current status of each item to indicate the changes to the item having the attached identification tag in the progress control database and materials database based on the current GPS coordinates of each item, the identification information of the item and the updated status of the item;
- providing a three dimensional (3D) model of the site; and
- changing the color of a display image of the item having the attached identification tag shown in the 3D model based on the current status of the item according to the updated information in at least one of the progress control database and materials database whereby, in use, the current status of each item of material on site is indicated in the display image.

15. A method of managing materials on a site as defined in claim 14, wherein the method comprises the further steps of:
- storing additional machine-readable information in the identification tag, including information relating to the ongoing maintenance of the item in the identification tag;
- transmitting the additional information to the materials database; and,
- updating a maintenance log for the item in the database whereby, in use, the ongoing maintenance of each item of material on site can be tracked.

16. A method of managing materials on a site as defined in claim 15, wherein the additional information stored in the identification tag also includes information relating to the progress of the item in the various stages of construction.

17. A method of updating a materials database for a materials management system for a site, the method comprising the steps of:
- providing a progress control database associated with the materials database, wherein the materials database stores material item records regarding the identity, current status and location of items and the progress control database stores information change records indicating changes made to each item associated with a project to be completed at the site;
- creating Rules of Credit each prescribing changes to be made to corresponding item for which information is stored in the progress control database;
- assigning each of the Rules of Credit to a corresponding item for which information is stored in the materials database;
- retrieving a material item record stored in the materials database upon receiving identification information scanned from an identification tag attached to an item of material, wherein the retrieved material item record includes a current status indicating a last change made to the item at the site as prescribed by the one of the Rules of Credit assigned to the item;
- tracking the current status of the item in the progress control database according to the assigned Rule of Credit, wherein the tracking includes updating the current status of the item in response to a change made to the item at the site;
- generating and displaying an update screen for the material item record wherein, in use, an operator inputs update information for the material item record, including the current GPS coordinates of the item of material and the current status of the item;
- updating the material item record in the materials database with the update information;
- providing a three dimensional (3D) model of a site where the item of material is to be installed; and,
- changing the color of the item shown in the 3D model based on the current status of the item according to the update information in the updated material item record of the materials database.

18. A method of updating a materials database as defined in claim 17, wherein the method of updating a materials database further comprises, in the case where a material item entry cannot be retrieved from the materials database based on the scanned identification information, the steps of:
- generating and displaying a search screen wherein, is use, an operator can specify a Mark No for the material item;
- searching the materials database for all items having the specified Mark No;
- displaying the search list for all items with the specified Mark No wherein, in use, an operator can select an item from the search list; and,
- retrieving a material item record stored in the materials database corresponding to the item selected by the operator.

19. A method of updating a materials database as defined in claim 18, wherein the method of updating a materials database further comprises, in the case where no items having the specified Mark No can be retrieved from the materials database or where none of the items with the specified Mark No corresponds to the material item, the steps of:
- generating and displaying a screen that enables the operator to create a new record in the materials database for the specified Mark No or material item; and,
- storing the new record in the materials database.

20. A method of updating a materials database as defined in claim 17, further comprising the steps of:
- monitoring the changes made to each item in the progress control database; and,
- using electronic tick sheets which are linked to the materials database to assist in recording the changes made to each item.

21. A materials management system for a construction site, the system comprising:
- a materials database for storing information relating to the nature, identity, status and location of each item of material on the construction site;
- a progress control database in which the progress at the construction site of changes to each item in the materials database is controlled according to a Rule of Credit assigned to the item;
- updating the current status indicating the last change made to each item at the site as prescribed by the Rule of Credit assigned to the item;
- a software module for color-coding each item on the site in a three dimensional (3D) model of the construction site, the software module monitoring the materials database and, as the current status of an item changes in the materials database, changing the color of the item in the 3D model to give a visual indication of the current status of the item; and,
- a mobile data processing device having a data scanner for scanning machine-readable information, including information identifying the item, the current status of the item, provided in an identification tag attached to one of the items of material, and a GPS receiver operatively connected to the mobile data processing device for obtaining the GPS coordinates of the item, the mobile data processing device transmitting the GPS coordinates, the identification information, the current status information to the progress control database and the materials database whereby, in use, the current status and the location of each item of material at the construction site can be tracked.

* * * * *